US011792432B2

(12) United States Patent
Choi et al.

(10) Patent No.: US 11,792,432 B2
(45) Date of Patent: Oct. 17, 2023

(54) TECHNIQUES FOR SIGNALING AND IDENTIFYING ACCESS UNIT BOUNDARIES (71) Applicant: TENCENT AMERICA LLC, Palo Alto, CA (US)

(72) Inventors: Byeongdoo Choi, Palo Alto, CA (US); Stephan Wenger, Hillsborough, CA (US); Shuai Zhao, Pleasanton, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/026,781

(22) Filed: Sep. 21, 2020

(65) Prior Publication Data

US 2021/0266599 A1 Aug. 26, 2021

Related U.S. Application Data (60) Provisional application No. 62/980,659, filed on Feb. 24, 2020.

(51) Int. Cl.
*H04N 19/70* (2014.01)
*H04N 19/142* (2014.01)
*H04N 19/42* (2014.01)
*H04N 19/174* (2014.01)
*H04N 19/172* (2014.01)

(52) U.S. Cl.
CPC .......... *H04N 19/70* (2014.11); *H04N 19/142* (2014.11); *H04N 19/172* (2014.11); *H04N 19/174* (2014.11); *H04N 19/42* (2014.11)

(58) Field of Classification Search
CPC ...... H04N 19/70; H04N 19/42; H04N 19/172; H04N 19/174; H04N 19/142

USPC .................................................... 375/240.26
See application file for complete search history.

(56) References Cited

U.S. PATENT DOCUMENTS

| 2004/0066854 | A1 | 4/2004 | Hannuksela | |
| 2006/0227872 | A1* | 10/2006 | Mori | H04N 21/434 375/E7.277 |
| 2008/0170564 | A1 | 7/2008 | Shi et al. | |
| 2010/0021142 | A1* | 1/2010 | Minami | H04N 19/44 386/241 |
| 2010/0316139 | A1* | 12/2010 | Le Leannec | H04N 19/82 375/240.29 |
| 2013/0114735 | A1 | 5/2013 | Wang | |
| 2014/0294093 | A1* | 10/2014 | Wang | H04N 21/6437 375/240.25 |

(Continued)

FOREIGN PATENT DOCUMENTS

| CN | 109565611 A * | 4/2019 | ......... H04N 21/2362 |
| EP | 2265026 A1 * | 12/2010 | ........... H04N 19/117 |

(Continued)

OTHER PUBLICATIONS

Machine translation of CN-109565611-A (Year: 2019).*

(Continued)

*Primary Examiner* — Christopher S Kelley
*Assistant Examiner* — Ana Picon-Feliciano
(74) *Attorney, Agent, or Firm* — Sughrue Mion, PLLC (57) ABSTRACT

A method and apparatus for identifying an Access Unit (AU) boundary in a coded video bitstream comprising: correlating information from at least one field from each of at least two Network Abstraction Layer (NAL) units.

20 Claims, 5 Drawing Sheets

(56) References Cited

U.S. PATENT DOCUMENTS

| | | | |
|---|---|---|---|
| 2015/0264404 A1* | 9/2015 | Hannuksela | H04N 19/463 |
| | | | 375/240.16 |
| 2016/0100196 A1* | 4/2016 | Wu | H04N 19/167 |
| | | | 375/240.02 |
| 2016/0234537 A1* | 8/2016 | Rodriguez | H04N 21/4384 |
| 2017/0339421 A1* | 11/2017 | Wang | H04N 19/30 |
| 2019/0166376 A1 | 5/2019 | Thomas et al. | |
| 2020/0137136 A1* | 4/2020 | Skupin | H04N 19/176 |
| 2021/0392361 A1* | 12/2021 | Hendry | H04N 19/188 |

FOREIGN PATENT DOCUMENTS

| | | | | |
|---|---|---|---|---|
| ES | 2330864 T3 | * | 12/2009 | H04N 9/8042 |
| JP | 2006-295568 A | | 10/2006 | |
| JP | 2017052515 A | * | 3/2017 | |
| WO | WO-2013156679 A1 | * | 10/2013 | H04N 19/00 |

OTHER PUBLICATIONS

Machine translation of JP-2017052515-A (Year: 2017).*
Machine translation of ES-2330864-T3 (Year: 2009).*
Sullivan et al.: G. J. Sullivan, J.-R. Ohm, W.-J. Han and T. Wiegand, "Overview of the High Efficiency Video Coding (HEVC) Standard," in IEEE Transactions on Circuits and Systems for Video Technology, vol. 22, No. 12, pp. 1649-1668, Dec. 2012, doi: 10.1109/TCSVT.2012.2221191. (Year: 2012).*
Wenger et al.: S. Wenger, Y.-K. Wang, Nokia, T. Schierl, Fraunhofer Hhi, A. Eleftheriadis. "RTP Payload Format for SVC Video draft-ietf-avt-rtp-svc-15. txt.", Audio/Video Transport WG Internet Draft, (Dec. 16, 2008). (Year: 2008).*
Chattopadhyay et al.: T. Chattopadhyay and A. Pal, "Two fold video encryption technique applicable to H.264 AVC," 2009 IEEE International Advance Computing Conference, Patiala, India, 2009, pp. 785-789, doi: 10.1109/IADCC.2009.4809114. (Year: 2009).*
Wiegand et al.: T. Wiegand, G. J. Sullivan, G. Bjontegaard and A. Luthra, "Overview of the H.264/AVC video coding standard," in IEEE Transactions on Circuits and Systems for Video Technology, vol. 13, No. 7, pp. 560-576, Jul. 2003, doi: 10.1109/TCSVT.2003. 815165. (Year: 2003).*
Zhou et al.: Y. Zou, T. Huang, W. Gao and L. Huo, "H.264 video encryption scheme adaptive to DRM," in IEEE Transactions on Consumer Electronics, vol. 52, No. 4, pp. 1289-1297, Nov. 2006, doi: 10.1109/TCE.2006.273147. (Year: 2006).*
International Search Report dated Jan. 8, 2021 from the International Searching Authority in International Application No. PCT/US2020/054246.
Written Opinion dated Jan. 8, 2021 from the International Bureau in International Application No. PCT/US2020/054246.
Communication dated Nov. 21, 2022, issued in Japanese Application No. 2021-561992.
Revised 3 edition, H.264/AVC Textbook, first Edition, Inc., Inc., Inc., Jan. 1, 2009, ISBN978-4-8443-2664-9, pp. 100-101 (4 pages).

* cited by examiner

FIG. 5
Computer System 500

TECHNIQUES FOR SIGNALING AND IDENTIFYING ACCESS UNIT BOUNDARIES

CROSS REFERENCE TO RELATED APPLICATIONS

This application claims priority under 35 U.S.C. § 119 to U.S. Provisional Application No. 62/980,659, filed Feb. 24, 2020 in the United States Patent & Trademark Office, which is hereby incorporated by reference herein in its entirety.

FIELD

The disclosed subject matter relates to network protocol(s) for delivering video over IP network(s), and more specifically, to the signaling of access unit (frame) boundary information for supporting individual access of frame(s) in the video payload format.

BACKGROUND

Figure 1:
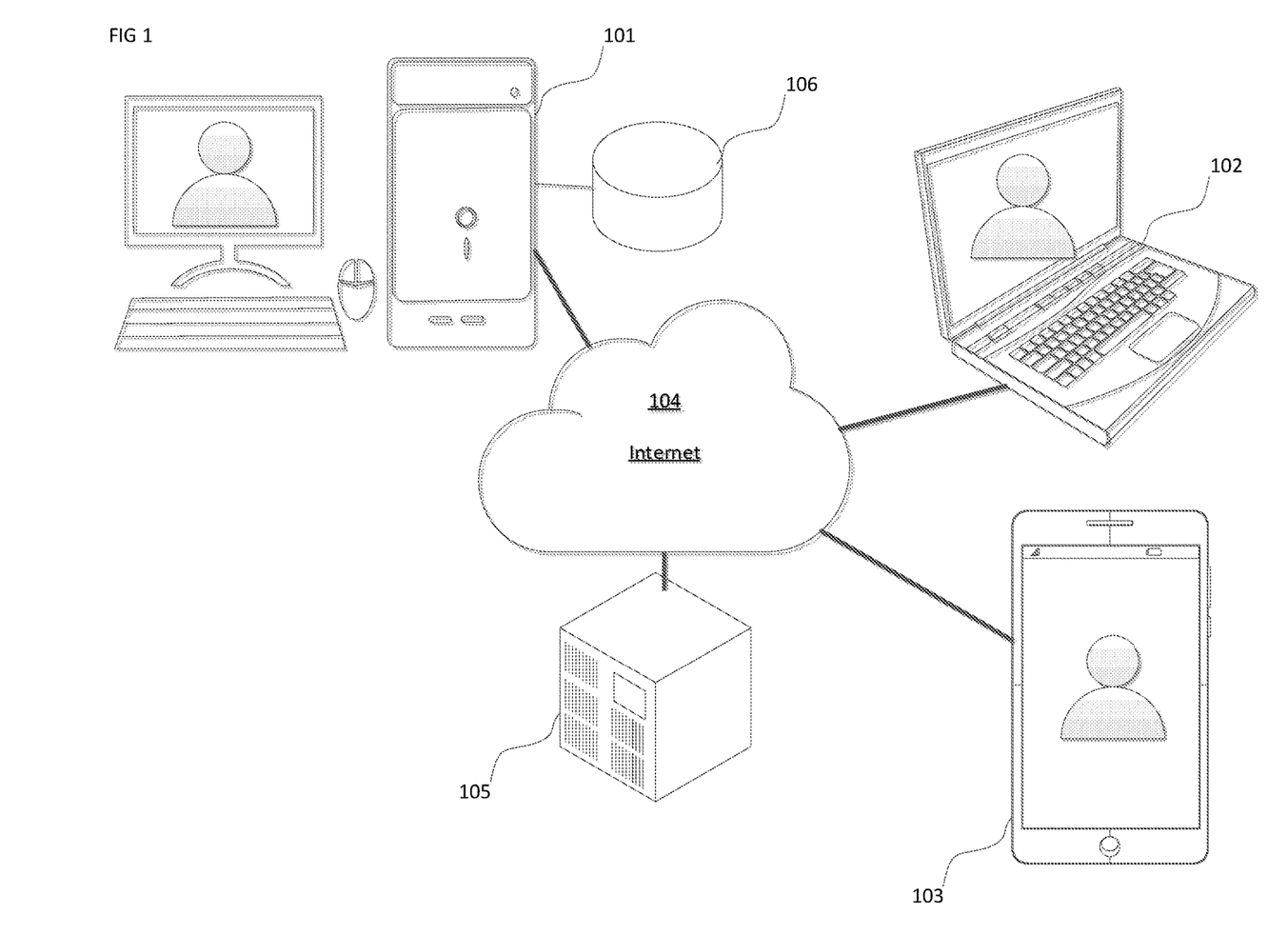
FIG. 1 is a schematic illustration of a media transmission system using RTP.

Referring to FIG. 1, a network connected system may comprise one or more endpoints (101, 102, 103) communicating with each other over an IP network (104), such as the Internet, using real-time media such as voice, video, and/or other media. The system may further comprise one or more media-aware network element(s) (105) configured, for example, to manipulate the media sent by an endpoint before forwarding it to another endpoint.

In certain such system designs, the endpoint(s) and/or Mobile Ad-hoc Network Emulator (MANE) may comprise a Real-time Transport Protocol (RTP) packetizer that sends RTP packets over a network to an RTP receiver located in, for example, another endpoint or MANE. In some cases, the sending endpoint may compromise a video camera, functionally coupled to a video encoder, which in turn may be coupled to the packetizer, such that video captured by the video camera may be transported using RTP packets from the sending endpoint, for example, endpoint (101), over the network (104) to a receiving endpoint for example 102).

In some cases, the sending endpoint may not comprise a video encoder. Instead, video may be obtained from a file stored on a hard drive or the like (106) coupled to the endpoint (101).

Figure 2:
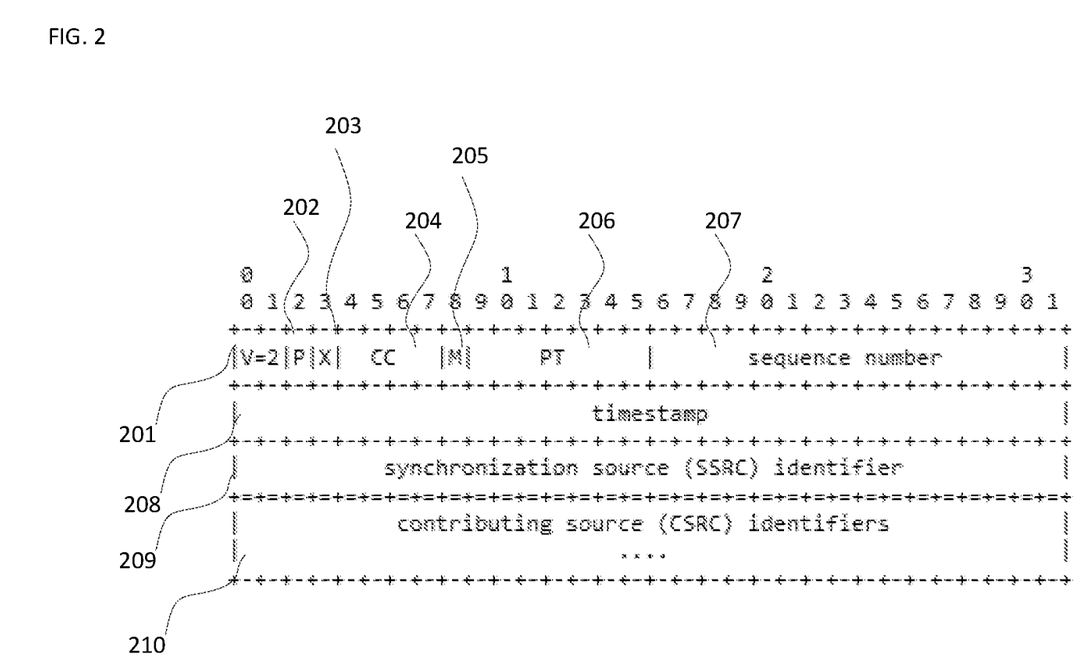
FIG. 2 is a schematic illustration of a an RTP header.

Certain real-time communication techniques for video over the Internet and other IP networks may rely on the Real-Time Transport Protocol (RTP), specified in RFC 3550. In some cases, RTP packets may be transported over User Datagram Protocol (UDP) over IP from one endpoint or MANE to another. Referring to FIG. 2, shown is an RTP header structure as specified in RFC3550. Here, each RTP packet may start with the RTP packet header. FIG. 2 illustrates the format of the RTP header as specified in RFC3550.

As illustrated in FIG. 2, Version (V) field (201) may identify the version of RTP and may be equal to 2. The Padding (P) field (202) may specify whether the packet contains one or more additional padding octets at the end. The Extension (X) field (203) may indicate whether the fixed header is followed by exactly one header extension. The CSRC count (CC) field (204) may contain the number of CSRC identifiers that follows the fixed header. The Marker (M) field (205) may allow marking of significant events such as AU boundaries in the packet stream. The Payload Type (PT) field may indicate the payload type (206)—the type of media in use, such as video encoded according ITU-T Recommendation H.264 using RTP payload format RFC 6184 with a certain set of RFC3984 parameters. PT may be, in many cases, selected by a call control protocol. The RTP sequence number (207) may increase by one for each RTP packet being sent until wrap-around. The RTP timestamp (208) may be indicative of a time instant when the first sample of a packet has been sampled (capture time) and may commonly be used as a presentation time. The timestamp for at least some video codecs may be 90 kHz, whereas for many audio codecs, the timestamp may be equal to the sampling rate such as 8 kHz, 44.1 kHz, or 48 kHz. The synchronization source (209) and contributing source (210) are introduced below.

RTP may follow the general approach of application layer framing, and hence the adaptation to certain payloads, such as coded video formats specified according to certain video coding standards, can be specified by helper specifications outside of the main RTP specification known as RTP payload formats. Certain RTP payload formats may re-use the bits of the Network Abstraction Header, as present in certain video coding standards, such as H.264 or H.265, as their payload header. In such RTP payload formats and video coding standards, a Network Abstraction Layer Unit (NAL unit or NALU) may be a bitstream of finite size, covering one coded picture or a well-defined part thereof, such as, for example, a slice, tile, GOB, and so forth.

The bitstream can include, at its beginning, a comparatively short data structure of, for example 8 or 16 bits in length, that contains minimal information related to the type of the bitstream included and, in some scenarios, layering information.

At least some video coding standards recognize the concept of an Access Unit (AU). In a single-layer case, an access unit can be composed of a single coded picture. In other cases, especially those related to layered coding and Multiview coding, an AU can comprise multiple coded pictures sharing certain timing information, for example having the same presentation time.

The RTP header may include a so-called "Marker" bit (M-bit) (205). By convention, in substantially all RTP payload formats that recognize the concept of an AU, the M-bit is specified to equal to one, for the RTP packet carrying the last bitstream of the AU, and may otherwise to be set to zero. When a receiver receives the RTP packet with the M-bit set, it typically knows that this RTP packet is the last packet of an AU and can handle it accordingly. Some details of such handling can be found in the RTP specification.

Briefly referring again to FIG. 1, assuming that sending endpoint (101) obtains its sending video bitstream from storage device/hard drive (106), such file may not include easily accessible meta information concerning access unit boundaries, for example because the bitstream may be stored, for example, in a format commonly known as "Annex B bitstream". In such a scenario, there may be no Application Programmer's Interface (API) information from the encoder to the RTP packetizer available that signals that a bitstream of the bitstream is the final bitstream of an AU. Instead, an RTP packetizer may have to identify the bitstream that includes the end of an AU without side information usually obtainable by the encoder.

SUMMARY

Disclosed are techniques for signaling and identifying of access unit boundary in video RTP payload format.

BRIEF DESCRIPTION OF THE DRAWINGS

Further features, the nature, and various advantages of the disclosed subject matter will be more apparent from the following detailed description and the accompanying drawings in which.

PROBLEM TO BE SOLVED

The Real-time Transport Protocol (RTP), can be used in a communication system utilizing streaming media. An RTP payload format for carrying the video data compliant with coding standard ITU-T Recommendation [H.266] and ISO/IEC International Standard [ISO23090-3], both also known as Versatile Video Coding (VVC), and developed by the Joint Video Experts Team (WET), have recently received attention. The RTP payload format allows for packetization of one or more Network Abstraction Layer (NAL) units in each RTP packet payload as well as fragmentation of a NAL unit into multiple RTP packets. The VVC video coding may be stored in a file as one long bitstream, without framing information beyond start codes. Without parsing substantially all details of this bistream, an RTP packetizer is unable to correctly set the M-bit as required by the RTP and RTP payload specifications.

DETAILED DESCRIPTION

In an embodiment, when the marker bit is set equal to 1, it may indicate that the current packet may be the last packet of the access unit (AU) in the current RTP stream. When the marker bit is set equal to 0, it may indicate that the current packet may not be the last packet of the access unit. Such use of the marker bit is in line with the common use of the marker bit in substantially all currently specified RTP payload formats for video.

Figure 3:
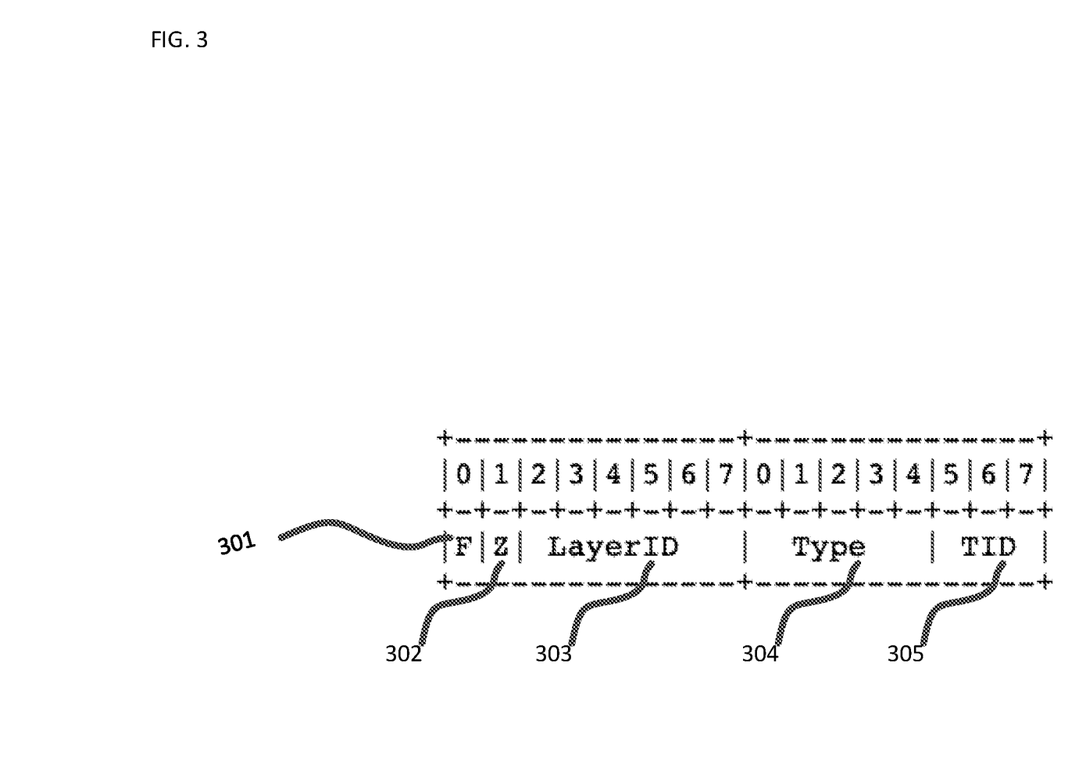
FIG. 3 is a schematic illustration of a NAL Unit Header of VVC with a bit boundary embodiment.

Referring to FIG. 3, in the same or another embodiment, an VVC NAL unit header may be composed of two bytes (16 bits). Here, 5 bits represent the NAL unit type (304). As a result, there can be up to 32 types of NAL units. Video Coding Layer (VCL) NAL units can have a type in a numerical range between 0 and 12, and non-VCL NAL units can have a type in a range between 13 and 31. The forbidden_zero_bit (F-bit, 301) may be required to be set to zero for the prevention of start code emulation. The nuh-reserved-bit (Z-bit, 302), may be required to be set to zero and reserved for future extension by ITU and ISO/IEC. The nuh-layer-id (LayerID, 303) may be used to identify the layer a NAL unit belongs to, such as a spatial scalable layer, or a quality scalable layer. The nal-unit-type (Type, 304) field may specify the NAL type and semantics based off VVC specification. The last nuh-temporal-id-plus1 (TID, 305) field may be the value of TemporalId plus 1 since A TID value of 0 may be illegal. This is to ensure one NAL must at least be one bit for code emulation.

In the same or another embodiment, the content of a NAL unit may not tell whether or not the NAL unit is the last NAL unit, in decoding order, of an AU—at least not without parsing potentially many other NAL units. Accordingly, without side information, a packetizer cannot trivially obtain that information from the video bitstream in isolation In, for example, a real-time encoding context, an RTP sender implementation may obtain this information from the video encoder or other system element(s) through, for example, an API. However, there can be scenarios where no such API is available either, including the one mentioned above where an Annex B bitstream is stored on a hard drove before streaming. When this information cannot be explicitly obtained from the encoder or other system element, then the sender implementation may be required to interpret NAL unit headers (and potentially also the payload data of NAL units) in decoding in order to determine whether the NAL unit is the last NAL unit of an access unit. This and other novel techniques used to obtain such information are described below.

Figure 4:
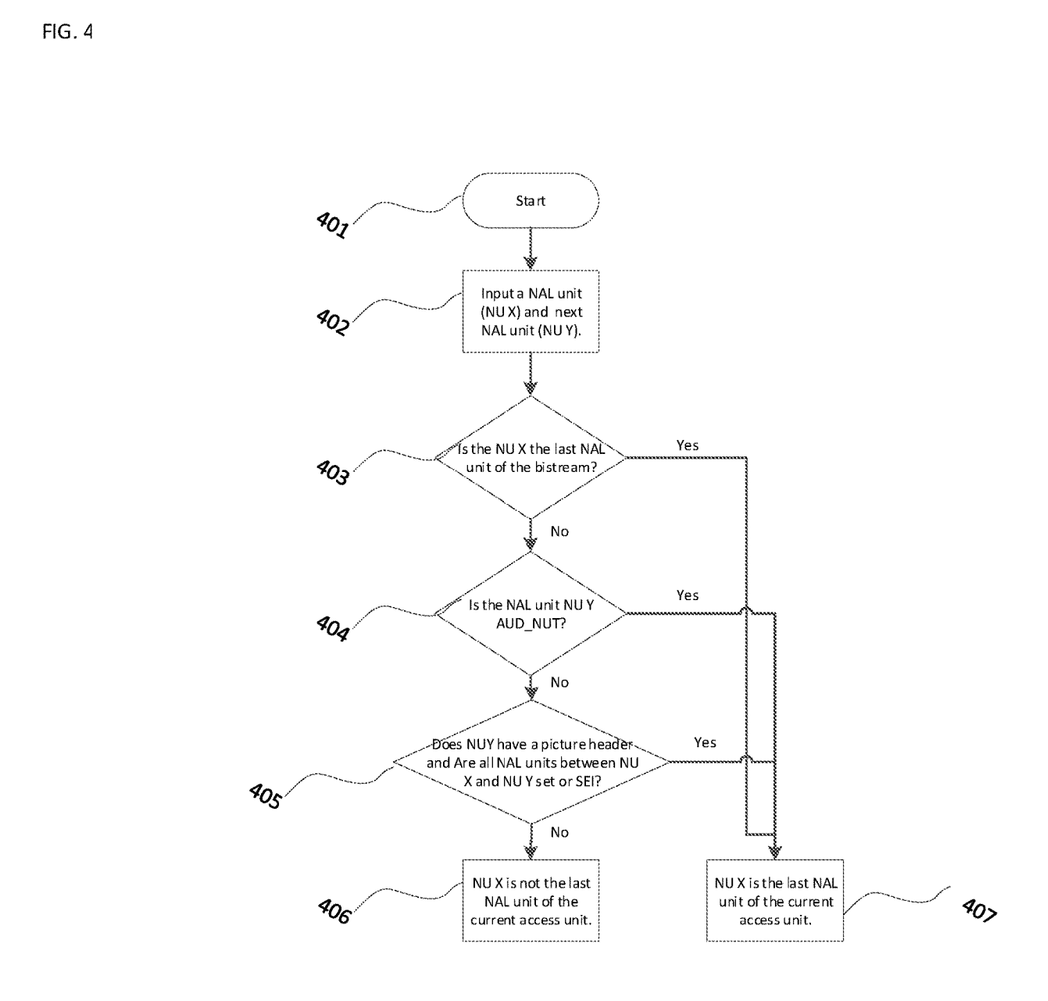
FIG. 4 is a schematic illustration of a simplified block diagram access unit boundary detection.

The Techniques for signaling and identifying the access unit boundary is illustrated in FIG. 4. Referring to FIG. 4, in the same or another embodiment, a NAL unit may be determined to be the last NAL unit of an AU if it is the last NAL unit of the bitstream.

Also referring to FIG. 4, an embodiment is illustrated for determining if a NAL unit is the last NAL unit of an AU. Here, the process may begin (401) when there are two NAL units in the decoding queue (402): A nalX unit and nalY unit. Here, a goal is to decide if nalX is the last bitstream of an AU, or if the nalY is the beginning of the next AU. If the nalX unit is the last NAL unit of this bitstream (~d03), the conclusion may be made that nalX is the last NAL unit of the current AU (407). However, if that is not the case, the following process may proceed.

Specifically, If the nalX is of a type of AUD_NUT (404), with a NAL unit type value 20, it is certain that the nalX is the last NAL unit of the current AU. If the nalX is not of the AUD_NUT NAL type, and the nalY has a picture header type unit, and also all the NAL units between nalX and nalY are of the parameter set or SEI NAL type, then it is determined that the nalX is the last NAL unit of the current AU, otherwise it is determined that the nalX is not a last NAL unit (406).

A NAL unit naluX may also be determined to be the last NAL unit of an AU if both the following conditions are true: 1) the next VCL NAL unit naluY in the decoding order has a high-order bit of the first byte after its NAL unit header is equal to 1 or nal_unit_type (304) is equal to 19, and 2) all NAL units between naluX and naluY, when present, have a nal_unit_type (304) in the range of 13 to 17, inclusive, equal to 20, equal to 23 or equal to 26.

In the same or a different embodiment, a NAL unit naluX may also be determined to be the last NAL unit of an access unit if both the following conditions are true: 1) the next VCL NAL unit naluY in the decoding order has a picture_header_in_slice_header_flag equal to 1 in a slice segment header or the nal_unit_type is set equal to PH_NUT, and 2) all NAL units between naluX and naluY, when present, have a nal_unit_type set equal to DCI_NUT, VPS_NUT, SPS_NUT, PPS_NUT, PREFIX_APS_NUT, AUD_NUT, PREFIX_SEI_NUT.

In the same or another embodiment, a NAL unit naluX may also be determined to be the last NAL unit of an access unit, when the next VCL NAL unit naluY in the decoding order has a nal_unit_type equal to AUD_NUT.

Figure 5:
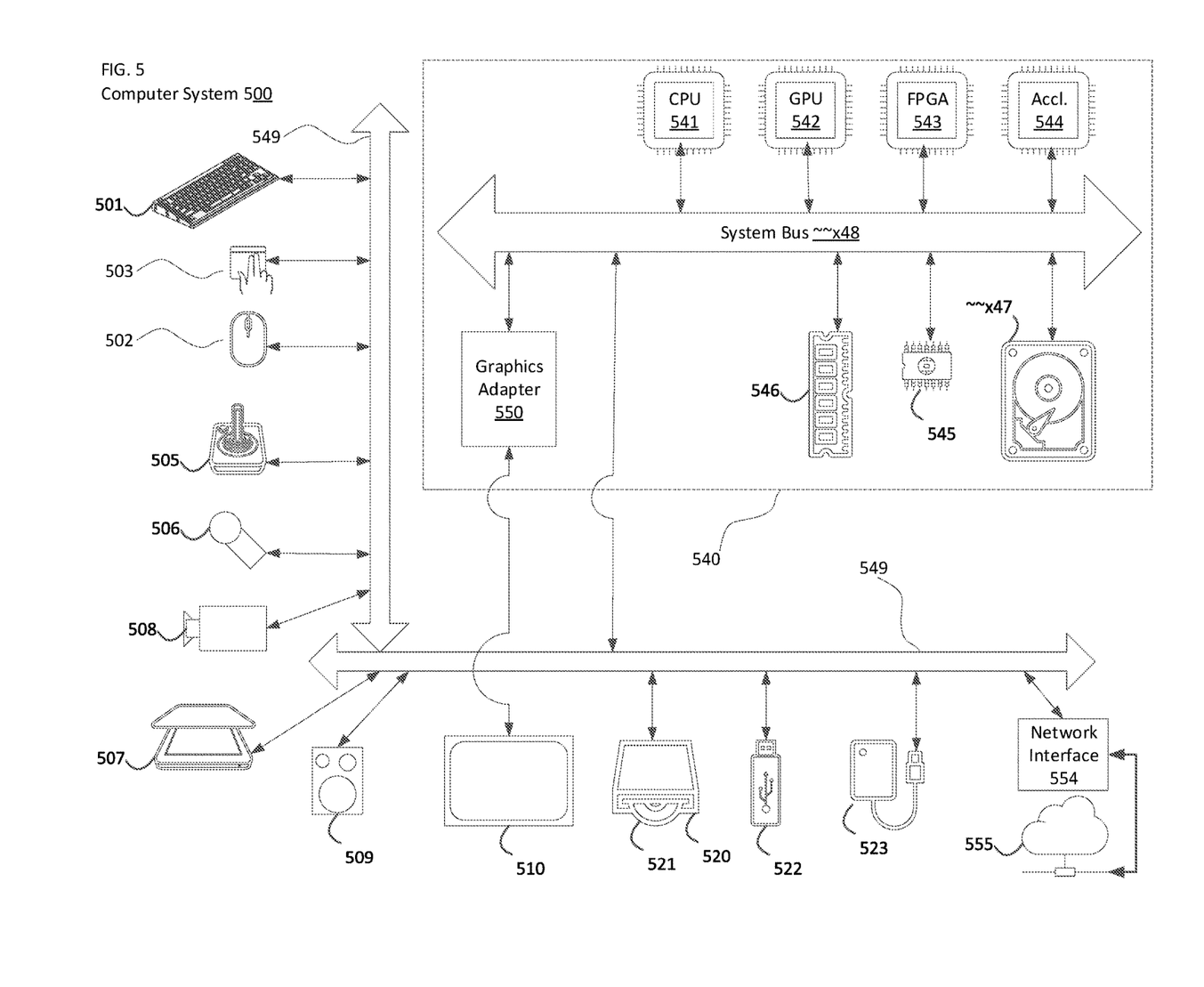
FIG. 5 is a schematic illustration of a computer system in accordance with an embodiment.

The techniques for identifying an Access Unit (AU) boundary in a coded video bitstream described above, can be implemented as computer software using computer-readable instructions and physically stored in one or more computer-readable media. For example, FIG. 5 shows a computer system 500 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 5 for computer system~500 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 500.

Computer system 500 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 501, mouse 502, trackpad 503, touch screen 510, data-glove 504, joystick 505, microphone 506, scanner 507, camera 508.

Computer system 500 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 510, data-glove 504, or joystick 505, but there can also be tactile feedback devices that do not serve as input devices), audio output devices (such as: speakers 509, headphones (not depicted)), visual output devices (such as screens 510 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 500 can also include human accessible storage devices and their associated media such as optical media including CD/DVD ROM/RW 520 with CD/DVD or the like media 521, thumb-drive 522, removable hard drive or solid state drive 523, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not necessarily encompass transmission media, carrier waves, or other transitory signals.

Computer system 500 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (549) (such as, for example USB ports of the computer system 500; others are commonly integrated into the core of the computer system 500 by attachment to a system bus as described below (for example Ethernet interface into a PC computer system or cellular network interface into a smartphone computer system). Using any of these networks, computer system 500 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 540 of the computer system 500.

The core 540 can include one or more Central Processing Units (CPU) 541, Graphics Processing Units (GPU) 542, specialized programmable processing units in the form of Field Programmable Gate Areas (FPGA) 543, hardware accelerators for certain tasks 544, and so forth. These devices, along with Read-only memory (ROM) 545, Random-access memory 546, internal mass storage such as internal non-user accessible hard drives, SSDs, and the like 547, may be connected through a system bus 548. In some computer systems, the system bus 548 can be accessible in the form of one or more physical plugs to enable extensions by additional CPUs, GPU, and the like. The peripheral devices can be attached either directly to the core's system bus 548, or through a peripheral bus 549. Architectures for a peripheral bus include PCI, USB, and the like.

CPUs 541, GPUs 542, FPGAs 543, and accelerators 544 can execute certain instructions that, in combination, can make up the aforementioned computer code. That computer code can be stored in ROM 545 or RAM 546. Transitional data can be also stored in RAM 546, whereas permanent data can be stored for example, in the internal mass storage 547. Fast storage and retrieve to any of the memory devices can be enabled through the use of cache memory, that can be closely associated with one or more CPU 541, GPU 542, mass storage 547, ROM 545, RAM 546, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system 500, and the core 540 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 540 that are of non-transitory nature, such as core-internal mass storage 547 or ROM 545. The software implementing various embodiments of the present disclosure can be stored in such devices and executed by core 540. A computer-readable medium can include one or more memory devices or chips, according to particular needs. The software can cause the core 540 and specifically the processors therein (including CPU, GPU, FPGA, and the like) to execute particular processes or particular parts of particular processes described herein, including defining data structures stored in RAM 546 and modifying such data structures according to the processes defined by the software. In addition or as an alternative, the computer system can provide functionality as a result of logic hardwired or otherwise embodied in a circuit (for example: accelerator 544), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of decoding an encoded video bitstream, the method being performed by at least one processor and comprising:
   determining whether a specified Network Abstraction Layer (NAL) unit is a last NAL unit, in a decoding order of an Access Unit (AU) in the bitstream, the determining comprising identifying an AU boundary by correlating information from at least one field from each of at least two NAL units, determining whether the specified NAL unit is a last unit of the bitstream, analyzing a type and a value of the specified NAL unit, determining a bit order of the at least two NAL units, and analyzing a header flag of the specified NAL unit.

2. The method of claim 1, wherein the correlation of the information from at least one field from each of the at least two NAL units includes correlating information from at least one of a picture header and a slice header of the at least two NAL units.

3. The method of claim 1, further comprising, before the determination of whether the specified NAL unit is the last NAL unit, parsing NAL unit headers of the at least two NAL units.

4. The method of claim 2, further comprising, before the determination of whether the specified NAL unit is the last NAL unit, parsing NAL unit headers of the at least two NAL units.

5. The method of claim 1, further comprising, before the determination of whether the specified NAL unit is the last NAL unit, parsing at least one of a picture header or a slice header of at least one of the at least two NAL units.

6. The method of claim 2, further comprising, before the determination of whether the specified NAL unit is the last NAL unit, parsing the at least one of the picture header and the slice header of the at least one of the at least two NAL units.

7. The method of claim 3, further comprising, before the determination of whether the specified NAL unit is the last NAL unit, parsing at least one of a picture header or a slice header of at least one of the at least two NAL units.

8. The method of claim 4, further comprising, before the determination of whether the specified NAL unit is the last NAL unit, parsing the at least one of the picture header and the slice header of the at least one of the at least two NAL units.

9. The method of claim 1, wherein the at least two NAL units include a nalX unit and nalY unit.

10. The method of claim 9, wherein the determination of whether the specified NAL unit is the last NAL unit, includes determining whether the nalX unit is a last NAL unit in the encoded video bitstream.

11. A device for decoding an encoded video bitstream comprising:
    at least one memory configured to store program code; and
    at least one processor configured to read the program code and operate as instructed by the program code, the program code including:
    determining code configured to cause the at least one processor to determine whether a specified Network Abstraction Layer (NAL) unit is last NAL unit, in a decoding order of an Access Unit (AU) in the bitstream, by performing: identifying an AU boundary by correlating information from at least one field from each of at least two NAL units, determining whether the specified NAL unit is a last unit of the bitstream, analyzing a type and a value of the specified NAL unit, determining a bit order of the at least two NAL units, and analyzing a header flag of the specified NAL unit.

12. The device of claim 11, wherein the determining code is further configured to cause the at least one processor to correlate information from at least one of a picture header and a slice header of the at least two NAL units.

13. The device of claim 11, wherein the program code further includes, first parsing code, configured to, parse NAL unit headers of the at least two NAL units.

14. The device of claim 12, wherein the program code further includes, first parsing code configure to, parse NAL unit headers of the at least two NAL units.

15. The device of claim 11, wherein the program code further includes parsing code configured to parse at least one of a picture header or a slice header of at least one of the at least two NAL units.

16. The device of claim 12, wherein the program code further includes parsing code configured to parse the at least one of the picture header and the slice header of the at least one of the at least two NAL units.

17. The device of claim 13, wherein the program code further includes second parsing code configured to parse at least one of a picture header or a slice header of at least one of the at least two NAL units.

18. The device of claim 14, wherein the program code further includes second parsing code configured to parse the at least one of the picture header and the slice header of the at least one of the at least two NAL units.

19. The device of claim 11, wherein the at least two NAL units include a nalX unit and nalY unit.

20. A non-transitory computer-readable medium storing instructions, the instructions comprising: one or more instructions that, when executed by one or more processors of a device, cause the one or more processors to:
   determine whether a specified Network Abstraction Layer (NAL) unit is a last NAL unit, in a decoding order of an Access Unit (AU) in the bitstream,
   wherein the determination including identifying an AU boundary by correlating information from at least one field from each of at least two Network Abstraction Layer (NAL) units, determining whether the specified NAL unit is a last unit of the bitstream, analyzing a type and a value of the specified NAL unit, determining a bit order of the at least two NAL units, and analyzing a header flag of the specified NAL unit.

* * * * *